(12) United States Patent
McKee et al.

(10) Patent No.: US 10,926,948 B2
(45) Date of Patent: Feb. 23, 2021

(54) LINER WITH LIFTING CRADLE

(71) Applicant: ILC Dover IP, Inc., Frederica, DE (US)

(72) Inventors: Tony R. McKee, Millsboro, DE (US); Mitch A. Mankosa, Baltimore, MD (US); Adam M Sadkowski, Lincoln, DE (US)

(73) Assignee: ILC Dover IP, Inc., Frederica, DE (US)

( * ) Notice: Subject to any disclaimer, the term of this patent is extended or adjusted under 35 U.S.C. 154(b) by 147 days.

(21) Appl. No.: 15/985,606

(22) Filed: May 21, 2018

(65) Prior Publication Data

US 2018/0339848 A1 Nov. 29, 2018

Related U.S. Application Data

(60) Provisional application No. 62/510,521, filed on May 24, 2017.

(51) Int. Cl.

| | |
|---|---|
| *B65D 88/62* | (2006.01) |
| *B65D 77/06* | (2006.01) |
| *B62B 1/12* | (2006.01) |
| *B65D 88/16* | (2006.01) |
| *B65D 90/04* | (2006.01) |

(52) U.S. Cl.
CPC .............. *B65D 88/62* (2013.01); *B62B 1/125* (2013.01); *B65D 77/061* (2013.01); *B65D 88/1618* (2013.01); *B65D 90/046* (2013.01); *B62B 2203/10* (2013.01)

(58) Field of Classification Search
CPC ..... B62B 1/125; B62B 2203/10; B65D 33/14; B65D 77/061; B65D 88/1618; B65D 88/1675; B65D 88/1681; B65D 88/1687; B65D 88/62; B65D 90/0033; B65D 90/046

USPC ................ 220/1.5, 1.6, 495.01, 495.06, 62.1
See application file for complete search history.

(56) References Cited

U.S. PATENT DOCUMENTS

| | | | | |
|---|---|---|---|---|
| 3,282,621 A | * | 11/1966 | Peterson ............ | B65D 88/1618 294/68.3 |
| 4,917,507 A | * | 4/1990 | Davidson ........... | B65D 88/1612 383/121 |
| 6,305,845 B1 | * | 10/2001 | Navin ................ | B65D 88/1618 383/109 |

(Continued)

*Primary Examiner* — James N Smalley
*Assistant Examiner* — Madison L Poos
(74) *Attorney, Agent, or Firm* — Baker Donelson Bearman Caldwell & Berkowitz PC

(57) ABSTRACT

A liner (10) includes a liner base (11) and a cradle (12) which is used in conjunction with a conventional intermediate bulk container (13). The liner base has a bottom wall (15), a top wall (16) opposite the bottom wall, and four side walls (17) extending between the bottom wall and top wall. The four side walls include a front wall (18), a rear wall (19), and two oppositely disposed end walls (20). The top wall includes a top opening fitment (22). The front wall includes a dispensing opening fitment (23). The liner lifting cradle includes a bottom panel (26), two oppositely disposed end panels (27), and a rear panel (28). The end panels have an elongated terminal end (30) which includes a reinforced mounting hole (32). The rear panel has an elongated terminal end (34) which includes a grommet (35) defining a reinforced mounting hole (36).

10 Claims, 2 Drawing Sheets

(56) References Cited

U.S. PATENT DOCUMENTS

| | | | |
|---|---|---|---|
| 2006/0023973 A1* | 2/2006 | Plunkett | B65D 75/5877 |
| | | | 383/22 |
| 2014/0205209 A1* | 7/2014 | Diao | B65D 88/1681 |
| | | | 383/7 |
| 2018/0194549 A1* | 7/2018 | Chartrel | B65D 88/165 |

* cited by examiner

LINER WITH LIFTING CRADLE

REFERENCE TO RELATED APPLICATION

Applicant claims the benefit of U.S. Provisional Patent Application Ser. No. 62/510,521 filed May 24, 2017 and entitled Liner with Lifting Cradle.

TECHNICAL FIELD

This invention relates to bulk material liners used in conjunction with intermediate bulk containers.

BACKGROUND OF THE INVENTION

Flexible liners are oftentimes utilized in conjunction with an intermediate bulk container or bag to ship large quantities of liquid, viscous or granular products. A problem long associated with the use of such liners has been the complete or near-complete evacuation of the contents from within the liner. This problem is especially true when shipping low viscosity liquids (<20,000 centipoise). As such, some liners have included pressurized regions to lift or angle the bottom of the liner in order to move the contents closer to the outlet of the liner. While these devices have aided in the evacuation of the liner they can still result in rather large quantities of content remaining within the liner.

Devices have also been used to lift or tilt the liner to aid in the dispensement of the contents. Another common issue experienced during evacuation of liquid liners is the considerable manual manipulation often required by the operator to guide the low viscosity liquids toward the discharge port during dispensing. This manipulation often requires lifting, tugging, or pulling of the liner by the operator during dispensing, which is ergonomically undesirable, and can result in injury. These devices may tilt the entire liner, as shown in U.S. Pat. No. 5,944,470, or may tilt only the floor of the liner, as shown in U.S. Pat. No. 5,788,449. These devices have proved to be difficult to use due to the massive weight of a filled liner.

Accordingly, it is seen that a need remains for an intermediate bulk container liner that can more efficiently evacuate the contents and eliminate the manual manipulation of the liner during the dispensing process. It is to the provision of such therefore that the present invention is primarily directed.

SUMMARY OF THE INVENTION

A liner having a cradle for aid in lifting the liner with contents. The cradle may be formed as part of the liner or may be separate from the liner for re-use.

A liner for use with an intermediate bulk material container comprises a liner body having a top wall, a bottom wall, and a plurality of side walls extending between the top wall and the bottom wall. The liner also has an outlet fitment coupled to one side wall of the plurality of side walls, and a cradle coupled to the liner body. The cradle has a bottom panel and a plurality of side panels overlaying a plurality of the side walls.

DETAILED DESCRIPTION

Figure 1:
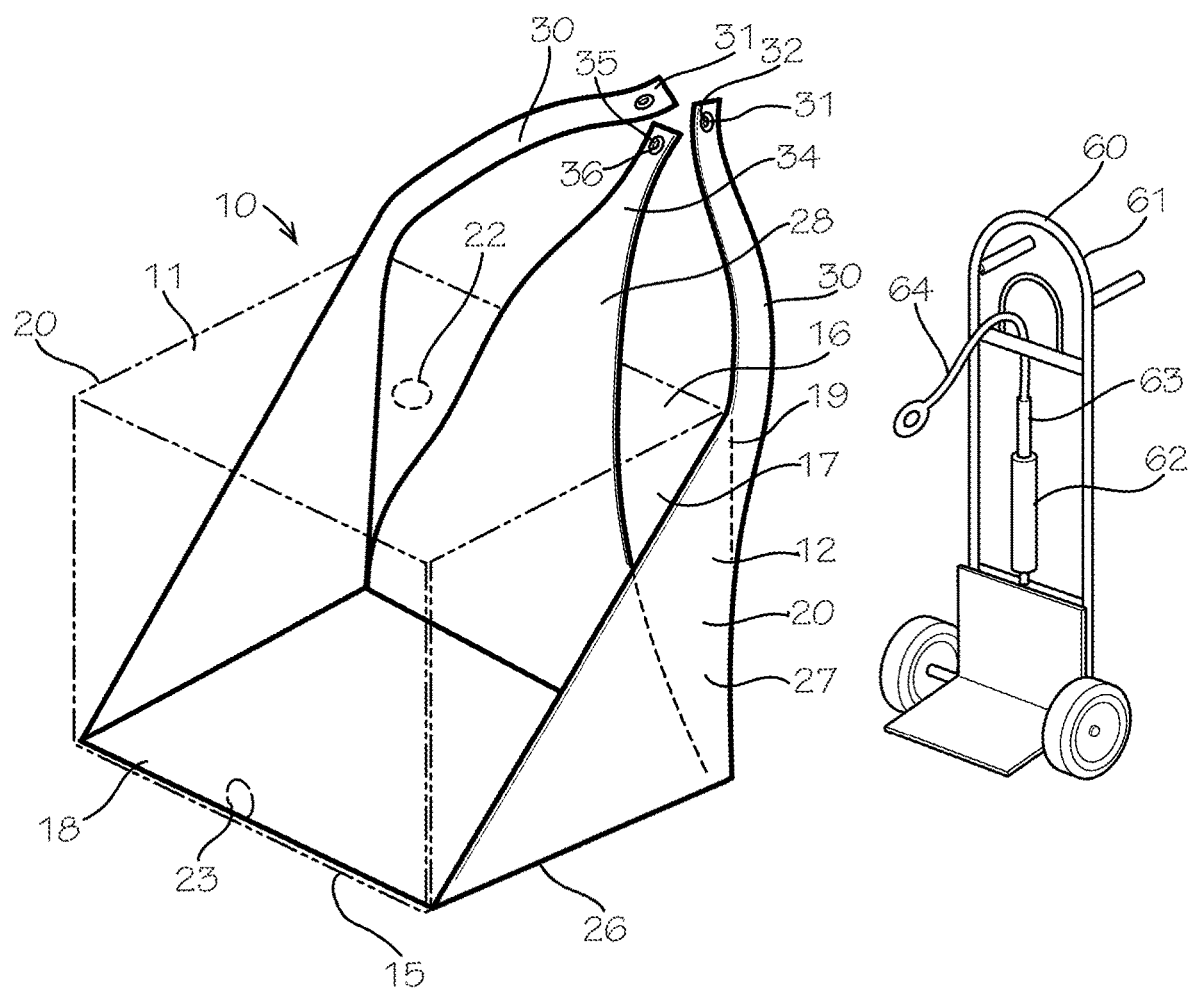
FIG. 1 is a perspective view of a liner embodying principles of the invention in a preferred form.
Figure 2:
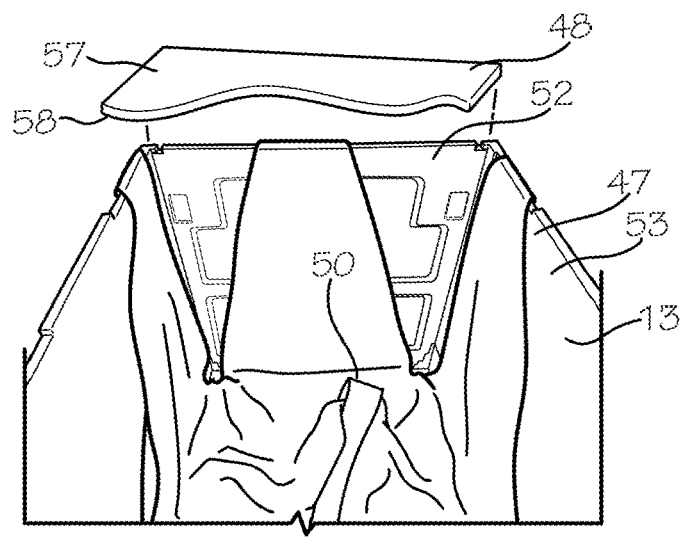
FIGS. 2-4 are a series of photographs showing the liner of FIG. 1 with an intermediate bulk container, the liner is shown empty of contents for ease of understanding.
Figure 3:
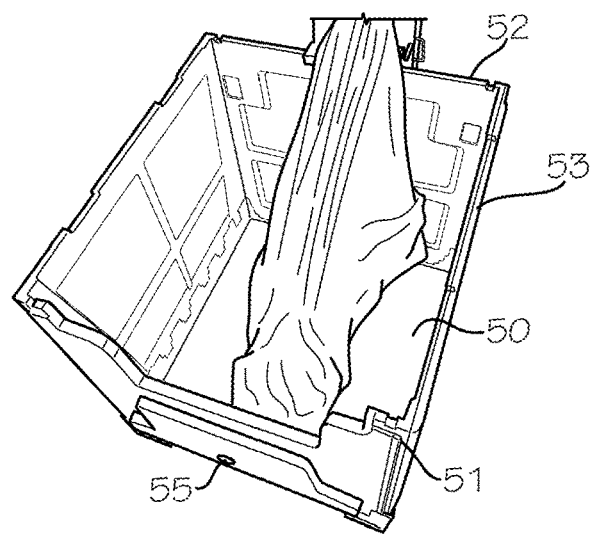
Figure 4:
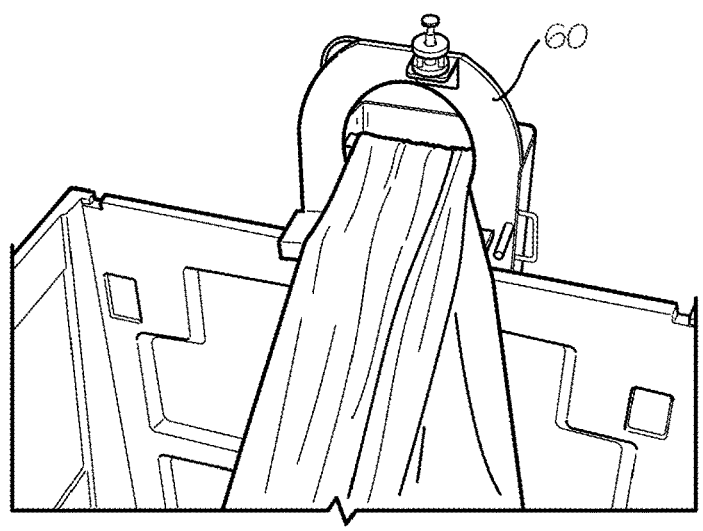

With reference next to the drawings, there is shown a flexible material liner 10 embodying principles of the invention in a preferred form. The liner 10 is of plastic film construction and includes a liner body or base 11 and a cradle 12 which is used in conjunction with a conventional intermediate bulk container 13.

The liner base 11 has the general configuration of a rectangular prism or cuboid, which may also be considered to be generally considered box-shaped. The liner base 11 has a bottom wall 15, a top wall 16 opposite the bottom wall 15, and four side walls 17 extending between the bottom wall 15 and top wall 16. The four side walls 17 include a front wall 18, a rear wall 19, and two oppositely disposed end walls 20.

The top wall 16 includes a top opening fitment 22 through which bulk material or content may be passed through and into the liner base 11. The top opening fitment 22 may be located anywhere upon the top wall 16. The front wall 18 includes an exit, discharge or dispensing opening fitment 23 positioned closely adjacent the bottom wall 15 through which the bulk material or content exits the liner base 11. The dispensing opening fitment 23 is located on a sidewall near the liner bottom wall 15 or upon the liner bottom wall itself. Preferably, the dispensing opening fitment 23 is located on the liner front wall 18 adjacent the junction with the liner bottom wall 15.

The liner lifting cradle 12 is preferable formed integrally with or coupled to the liner base 11. The liner lifting cradle 12 is preferably coupled to the liner base 11 through welding heat seals along the base corners, or along the liner base seams or corner edges. Alternatively, an adhesive, such as a hot melt adhesive or pressure sensitive adhesive tape, may be used to couple to liner lifting cradle 12 to the liner base 11. However, it should be understood that the cradle 12 may alternatively be formed as a separate and apart portion which is simply nested or received within the liner base 11. The liner lifting cradle 12 may be made of a specially designed film, fabric, coated fabric, rigid or semi-rigid fiberboard, or other similar material. Examples of suitable films are a heavy gauge polyolefin film or polyurethane film. The panels may also include straps or webbing to reduce the amount of film or fabric used to construct the panel. Such a strap or webbing may be a continuous extension of the film, fabric, or fiberboard and would preferably be attached to the film at the upper or lower corners of the liner. The straps or webbing may also be detachable from the remaining portion of the panels so that they may be reused.

The liner lifting cradle 12 includes a bottom wall or panel 26, two oppositely disposed end walls or panels 27, and a rear wall or panel 28. The end panels 27 and rear panel 28 may be considered to be side panels. The end panels 27 are generally triangular in shape with an elongated top or terminal lifting end 30 which includes a mechanical coupler in the form of a reinforced mounting hole or grommet 31 defining a mounting hole 32. Similarly, the rear panel 28 is generally triangular in shape with an elongated terminal lifting end 34 which includes a coupler in the form of a grommet 35 defining a mounting hole 36. The panels generally overlay the corresponding sidewalls of the liner base 11. The term overlay and overlaying, as used herein, means that the panels closely cover a portion of the sidewalls and is not intended to mean that it is merely positioned vertically above or over the sidewall without respect to the distance therebetween.

The intermediate bulk container 13 is of a generally rigid construction made of a plastic, cardboard, or paper material which is configured or shaped similarly to the liner base 11 so as to receive the liner 11 therein. The container 13 includes a bin or bottom portion 47 and a lid 48 configured to fit upon the top end of the bin 47. The bin 47 has a bottom wall or floor 50, a front wall 51, a rear wall 52, and two oppositely disposed end walls 53. The front wall 51 includes a front opening 55 aligned with and configured to receive the dispensing opening fitment 23 of the liner therein. The walls 51, 52, and 53 of the bin are of a size to contain the material within the liner without breaking or fracturing, as such they are extremely strong in nature and are capable of withstanding a great deal of force thereon. The lid 48 includes a top wall 57 and four downwardly extending side edges 58 which are configured to fit snugly about the top end of the bin.

In use, material or contents to be shipped are transported or poured into the liner through the liner top opening fitment 22 until the desired amount is reached. The terminal lifting ends 30 and 34 of the end panels 27 and rear panel 19 are then placed upon the top wall 15 of the liner base 11. The bulk container lid 28 is then placed upon the bin for transportation.

At the dispensement of content site, the lid 28 is removed from the bin 27 to expose the top of the liner 10 with the liner lifting cradle terminal lifting ends 30 and 34. The liner dispensing opening fitment 23 is then opened so that the contents within the liner may gravitationally flow therethrough. A pump may be utilized to provide a negative pressure to aid in the dispensement of the contents. Also, the top opening fitment 22 may be opened to allow for venting of the interior of the liner base during discharge of the contents.

Next, the liner lifting cradle 12 of the filled liner 10 is coupled to a mechanical lifter or tensioning device 60. The tensioning device 60 may be a pneumatic system which is releasably coupled to the exterior of the container 13. The tensioning device 60 may include a portable hand truck 61 which is pushed into position engaging the container. The tensioning device 60 includes a pneumatic cylinder 62 having a reciprocating piston 63, a pneumatic actuated linear slide, or a pneumatically actuated cable tensioning system which is coupled to one or more tensioning cables 64. The tensioning cables 64 are coupled to the liner lifting cradle 12 through hooks or other attachments which are configured to be coupled with the hole 32 of grommet 31 of the end panels and the hole 36 of grommet 35 of the rear panel 28. Alternatively, the end panel holes may be overlapped and thermally welded in unison, such that the holes in all the end panels align to a single hole for connection to the tensioning cables system. The connection may be facilitated with the use of a single dowel rod which is pushed through the hole and rotated 90 degrees to secure the cable to the lifting cradle during the tensioning process. The connection also may be facilitated with any number of alternative hooks, grommets, eyelets, or clamping components. The movement of the piston 63 provides an even upward pull or lifting force upon the end panels 27 and rear panel 28 as the liner contents are emptied.

The pulling upon the cradle end panels 27 and rear panel 28 causes the upward lifting of the rearward bottom corners of the cradle 12 which directly forces the upward movement of the corresponding portion of the liner base 11 during discharge. This lifting continuously occurs so as to continuously lift the liner base at such an angle so as to allow for gravity-assisted flow of the contents within the liner base towards the discharge opening fitment 23. Essentially the lower corner edges are lifted to create a sump or low lying area in the area of the discharge opening fitment 23 to provide better discharge while also preventing the folding of the liner material, which may create a blockage of the discharge opening fitment. Additionally, the lifting cradle creates a folding effect on the liner towards the end of the dispensing, such that the side wall panels of the liner lift and fold upward in vertical orientation. This effect ensures that all liquid or contents in the liner are channeled towards the discharge fitment for complete dispensement.

Once the liner is emptied, the tensioning cables 64 are disconnected from the liner lifting cradle 12 by disconnecting the tensioning cable interface from the liner lifting cradle. The tensioning device 60 is then unmounted or removed from the container 13.

It should be understood that as an alternative to the pneumatic cylinder and piston, the tensioning device 60 may also be a hydraulic system, manual jack screw, electric winch, hand operated winch of other similar device for creating a tensioning force upon the liner lifting cradle 12.

It thus is seen that a liner or combination liner and lifting cradle is now provided which overcomes problems associated with liners of the prior art. While this invention has been described in detail with particular references to the preferred embodiments thereof, it should be understood that many modifications, additions and deletions, in addition to those expressly recited, may be made thereto without departure from the spirit and scope of the invention.

The invention claimed is:

1. A liner for use with an intermediate bulk material container, said liner comprising,
   a liner body having a top wall, a bottom wall, and a plurality of side walls extending between said top wall and said bottom wall which include two oppositely disposed end walls, a front wall, and a rear wall;
   an outlet fitment coupled to one said side wall of said plurality of side walls, and
   a cradle coupled to said liner body, said cradle having a bottom panel at least partially overlaying said bottom wall a pair of oppositely disposed end panels, and a rear panel, each said end panel having a top edge extending from a position located at a corner formed by said liner front wall, one said liner end wall, and said liner bottom wall, to a position located at a second corner formed by said liner rear wall, said one liner end wall, and said liner top wall, each said side panel also including a top end having a mechanical coupler,
   whereby the couplers are coupled to a mechanical lifter which raises the cradle during use.

2. The liner of claim 1 wherein each said mechanical coupler is a reinforced mounting hole extending through said top end to form mounting holes.

3. The liner of claim 1 wherein said rear panel is generally triangular in shape.

4. The liner of claim 1 wherein said side panels of said cradle are made of a flexible material.

5. The liner of claim 4 wherein said bottom panel of said cradle is made of a flexible material.

6. The liner of claim 1 wherein said cradle is fixedly mounted to said liner body.

7. A liner for use with an intermediate bulk material container, said liner comprising,
   a liner body having a front wall, a rear wall, a top wall, a bottom wall, and two oppositely disposed end walls;

an outlet fitment coupled to said liner body front wall, and a flexible material lifting cradle adapted to receive said liner body therein, said flexible material lifting cradle including a pair of oppositely disposed end panels, each said end panel extending diagonally across one said liner body end wall from a position adjacent a lower, front corner of said liner body to a position adjacent an upper, rear corner of said liner body, whereby the lifting cradle may be coupled to a mechanical lifting device to raise the cradle and thereby raise the liner body allowing for the dispensement of contents from the liner body through the outlet fitment.

8. The liner of claim 7 wherein each said side panel of said plurality of side panels includes a flexible terminal end having a coupler, whereby the couplers are coupled to the mechanical lifting device.

9. The liner of claim 7 wherein said rear panel is generally triangular in shape.

10. The liner of claim 7 wherein said cradle is fixedly mounted to said liner body.

\* \* \* \* \*